Jan. 4, 1949. J. W. STAFFORD 2,458,440
CRYSTALLIZER
Filed April 24, 1946 3 Sheets-Sheet 1
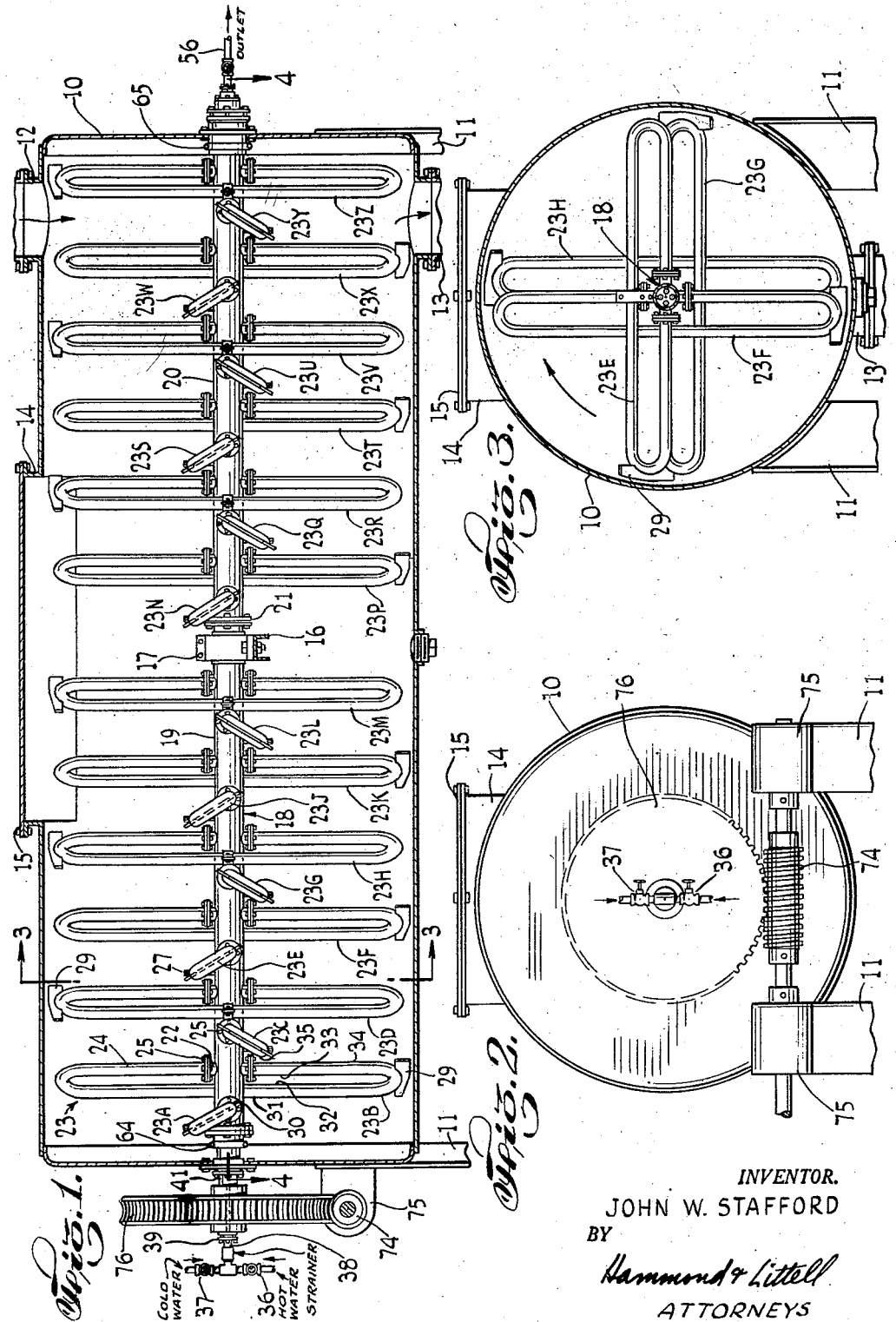
INVENTOR.
JOHN W. STAFFORD
BY
Hammond & Littell
ATTORNEYS Jan. 4, 1949. J. W. STAFFORD 2,458,440
CRYSTALLIZER
Filed April 24, 1946 3 Sheets-Sheet 2
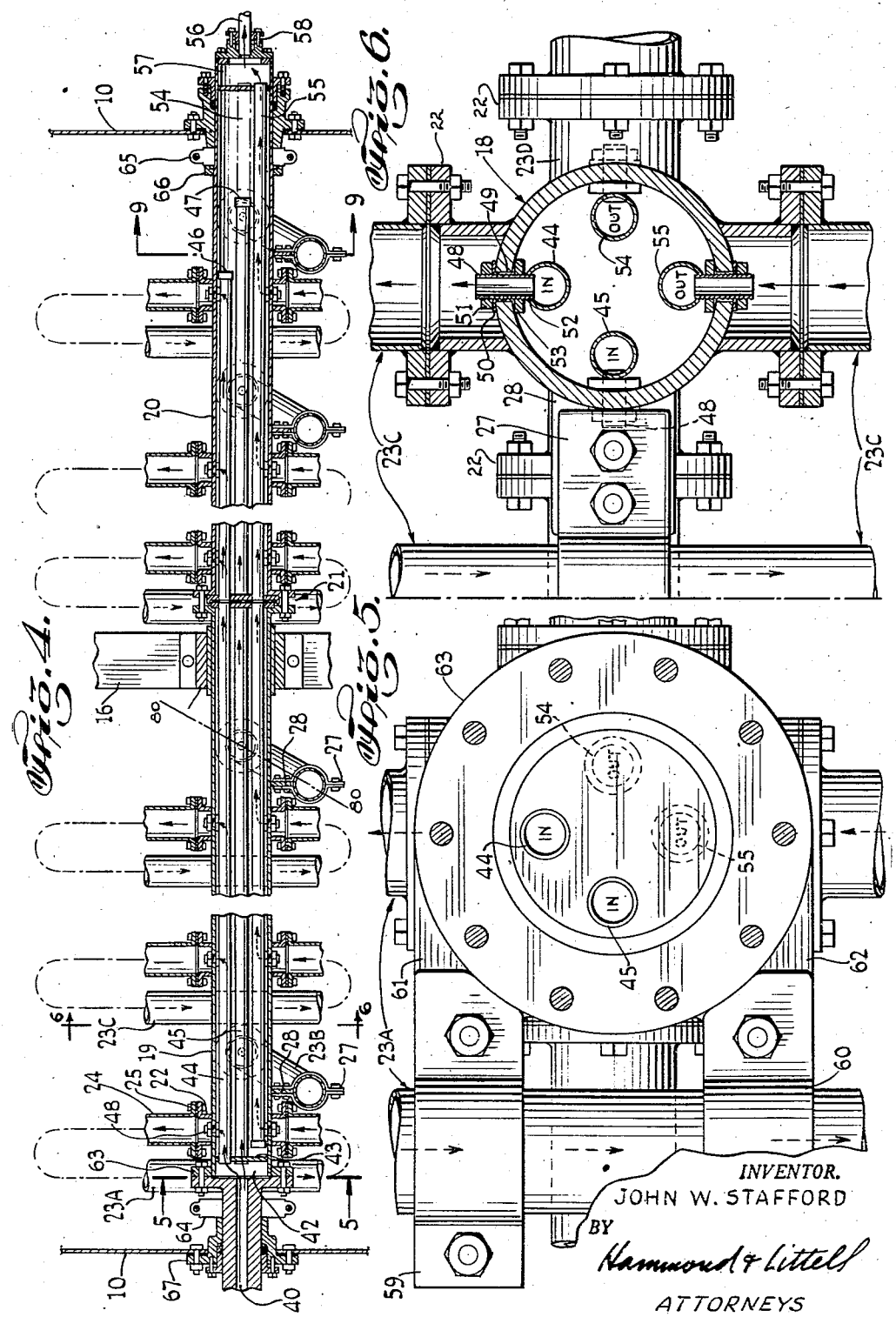
INVENTOR.
JOHN W. STAFFORD
BY
Hammond & Littell
ATTORNEYS Jan. 4, 1949.　　　　J. W. STAFFORD　　　　2,458,440
CRYSTALLIZER
Filed April 24, 1946　　　　　　　　　　3 Sheets-Sheet 3
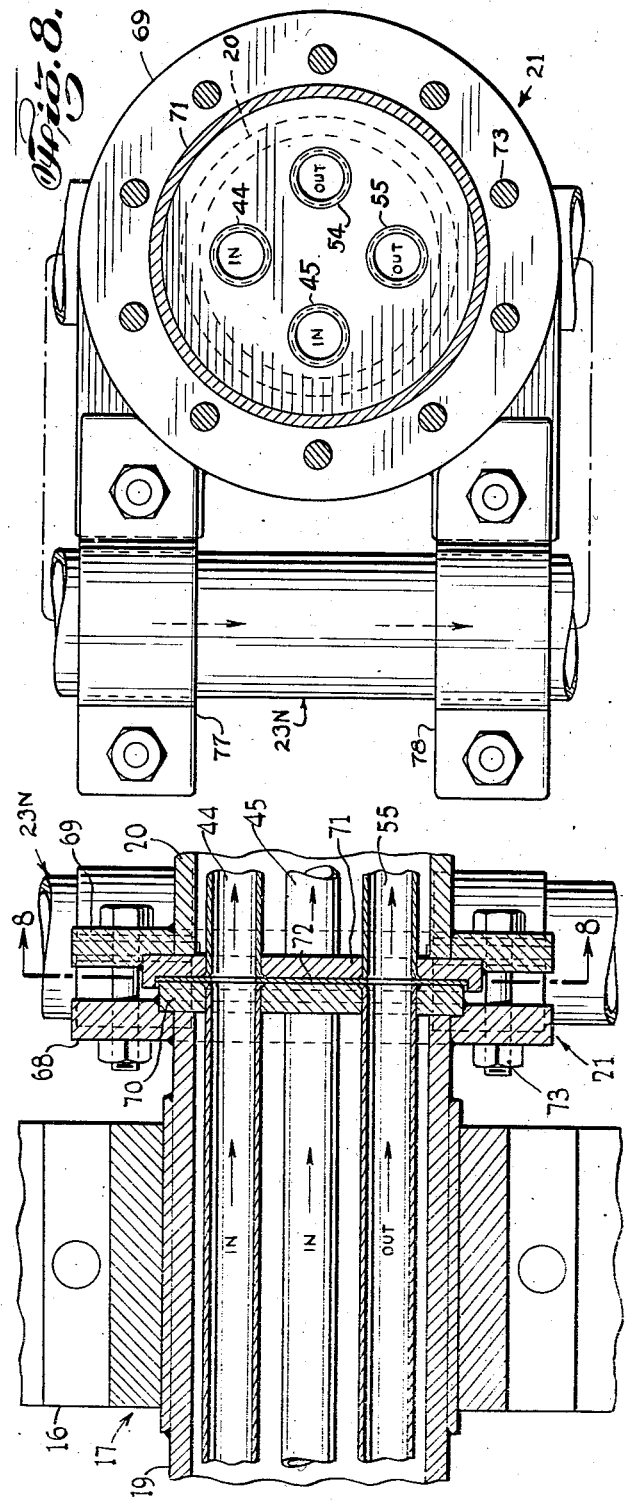
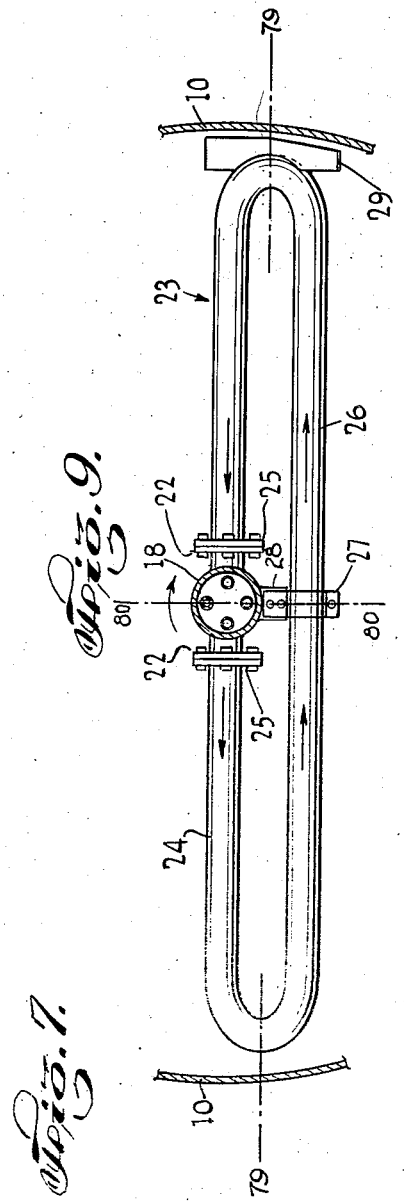
INVENTOR.
JOHN W. STAFFORD
BY
Hammond & Littell
ATTORNEYS Patented Jan. 4, 1949

2,458,440

UNITED STATES PATENT OFFICE 2,458,440

CRYSTALLIZER

John W. Stafford, Hohokus, N. J., assignor to The Turl Iron and Car Company, Inc., New York, N. Y., a corporation of New York Application April 24, 1946, Serial No. 664,455

12 Claims. (Cl. 127—15)

This invention relates to crystallizers, and particularly to new and improved apparatus for use in completing the growth of sugar crystals in their mother liquor or massecuite and in reheating the crystallized massecuite if desired.

The main object of this invention is to provide crystallizer apparatus which will keep all parts of a large body of massecuite in continual relative motion and continual and uniform heat exchange with a circulating fluid, so that a complete and uniform growth of the sugar crystals and optimum exhaustion of their mother liquor may be brought about in a reduced period of time. A further resulting object is to reduce the equipment, space, labor, and time requirements, and hence the cost, of the "after-working" or final crystallization of massecuites in sugar factories and refineries.

One of the features of the invention is the provision of a rotary coil structure wherein pipes forming a plurality of planar closed loops of generally rectangular shape are mounted on a shaft which is rotatable to cause said loops to pass through a body of massecuite. The pipes of the loops are arranged so that heat exchange medium can be passed therethrough and so that during a complete revolution of the shaft substantially every portion of the body of massecuite will be reached by said loops.

Another feature of the invention is a fluid circulation system for the loops which will feed each of them with heat exchange medium at substantially the same temperature, and a further feature is a construction of such system whereby the objectionable heat exchange is avoided between the ingoing and outgoing streams of the heat exchange medium so that full efficiency of operation, such as for cooling massecuite or the like, is brought about. Many standard parts and pipe fittings may be used in the construction of the loops, circulation system, and shaft.

A suitable loop is formed of two parallel longitudinal legs with connecting pipes at either end thereof. The contour of such a loop is made generally rectangular in shape, and the centerlines of the pipes of the legs and of the connecting pipes are arranged to fall substantially in one plane. One of the legs, which is referred to herein as the interrupted leg, preferably is made so that the centerlines of the pipes thereof intersect the shaft, and for each loop two flanged short pipes preferably project from opposite sides of the shaft for fastening the pipes of said interrupted leg to said shaft. The individual loops are spaced along the shaft, adjacent loops being at right angles to each other and parallel loops (every other loop) having the uninterrupted legs thereof passing on opposite sides of the shaft. The transverse axis of the plane passing through the centerlines of the pipes of each loop is disposed angularly to the shaft so that the two parallel legs of each loop are offset relative to each other longitudinally of the shaft. As will be described hereafter, the size of pipe and angles of the transverse axes of the planes relative to the shaft can be chosen so that substantially the entire body of the massecuite in the crystallizer will be traversed by the pipes of the loops during a complete revolution of the shaft.

These and other objects, features, and advantages of the invention will become apparent from the following description and drawings which are to be considered merely as exemplary.

In the drawing:

Fig. 1 is a longitudinal sectional view with the loops, shafts, and bearings shown in full lines.

Fig. 2 is an end view looking from the left end of Fig. 1.

Fig. 3 is a cross sectional view taken in the direction 3—3 of Fig. 1.

Fig. 4 is a fragmentary, broken, sectional view showing details of construction of the shaft taken along the line 4—4 of Fig. 1.

Fig. 5 is a fragmentary, sectional view taken along the line 5—5 of Fig. 4.

Fig. 6 is a fragmentary view taken in the direction of the line 6—6 of Fig. 4, the interrupted leg of the loop being shown in section and the uninterrupted leg being shown in full.

Fig. 7 is an enlarged detail sectional view taken through the central support of Fig. 4.

Fig. 8 is a sectional view taken along the line 8—8 of Fig. 7.

Fig. 9 is an enlarged detail view of one of the loops.

In a preferred embodiment, drum 10 (Fig. 1) may be supported at 11 in any suitable manner, intake opening 12 and exhaust opening 13 being provided for admitting and withdrawing the material to be treated in the drum. Clean-out or access opening 14 has cover 15 thereon, said opening allowing access to the center bearing and to the interior of the drum. Drum 10 may have a central support 16 with a bearing 17 thereon for supporting the central part of the shaft 18, shaft 18 being formed in two parts 19 and 20, said parts being joined by coupling 21. It is to be understood, of course, that if the drum is short, only one section of shaft need be used, or that if desired, more than two sections of shaft may be employed. The shaft may be made of pipe and may have a plurality of short flanged pipes 22 extending therefrom, said flanged pipes being joined to the shaft by welding or in any desired manner. As an example of one method of construction, short pieces of pipe are welded to the shaft and flanges are welded to said short pipes.

Mounted on said flanged pipes 22 are a plurality of closed pipe loops or heat-exchange-medium-carrying loops, indicated generally by the numeral 23. The loops preferably have two parallel pipe legs joined by U-shaped pipe connections at each end. One leg 24 of each loop is interrupted and is composed of two pieces of pipe which can be joined to said flanged pipes 22. As appears in the drawings, these two portions of the interrupted leg of each loop are substantially aligned with each other and connected with shaft 18 astraddle said shaft. It is seen that the loops are generally rectangularly shaped but it is apparent that other equivalent forms and shapes can be used, and that other constructional elements may be used. The term "planar" means that the centerlines of the pipes are substantially in the same plane, especially the parallel longitudinal legs although, of course, some slight variation from the plane can be made.

Brackets 27 and lugs 28 are spaced longitudinally relative to the shaft axis from the centerline of the interrupted leg of a loop. Thus, the transverse axis of the plane passing substantially through the centerlines of the pipes of a loop will be at an acute angle relative to the shaft axis. The axis parallel to the centerline of the longitudinal legs of the loops, or the longitudinal axis of the plane passing through the loops, is made substantially perpendicular to the shaft axis. Longitudinal axis means the axis substantially parallel to the two long legs of the loop and located substantially half way between said legs. The transverse axis means the axis substantially at right angles to said longitudinal axis and located at substantially the middle of the loop. A longitudinal axis is indicated at 79—79 in Fig. 9 and a transverse axis is shown at 80—80, Figs. 4 and 9.

For convenience, the loops are designated 23A to 23Z, inclusive, the letters I and O being omitted to avoid confusion. As previously mentioned, it is to be noted that the longitudinal axes of adjacent loops are 90° apart and the loops are mounted so that the loops having their longitudinal axes parallel (every other loop) will have the uninterrupted legs thereof on opposite sides of the shaft.

Blades 29 are mounted on the U-shaped pipe connecting one of the ends of the legs of each of the loops, a blade being fastened to the loop in any suitable way, preferably by welding. The blades are arranged serially 90° apart in successive loops the length of the shaft so that the blades form an interrupted spiral looking from left to right of Fig. 1 and thus will tend to stir the material in the drum towards the right. An exact spiral is not formed by the blades, but it is evident that the blades may be tilted in various manners so as to provide the desired stirring or scraping action in the crystallizer.

Referring to Fig. 3, blade 29 on 23E is to the left. The next loop 23F has its blade located 90° after the blade of 23E, the direction of rotation of the shaft being indicated by the arrow. The blade 23G is 90° after the blade of 23F and the blade of 23H is 90° after the blade of 23G.

As an illustration of the very small distance between the paths of the pipes during a revolution of the shaft, the plane perpendicular to the shaft axis and tangent to the right-hand surface 30 of the pipes of the interrupted leg of loop 23A (Fig. 1) is close to the plane perpendicular to the shaft axis and tangent to the left surface 31 of the uninterrupted leg of loop 23B. A similar plane tangent to the right-hand surface 32 of the uninterrupted leg of 23B is close to a similar plane tangent the left-hand surface 33 of the interrupted leg of 23B. A similar plane tangent to the right surface 34 of the interrupted leg of 23B is close to a similar plane tangent to the left surface 35 of the uninterrupted leg of loop 23C. Such an arrangement continues along the shaft for the other legs so that as shaft 18 is turned, it will be apparent that the successive surfaces of the legs will pass through substantially the entire body of material contained in the drum. If the pipes are increased in size or the angles of the transverse axes relative to the shaft and spacing be changed, it is apparent that the paths of the legs can be made to overlap.

Shaft 18 has four conduits therein for the purpose of leading a heat exchange medium, such as water, to and from each of the coils. Valves 36 and 37 (Fig. 1) may be used to adjust the proportion of hot and cold water entering pipe 38. Pipe 38 passes through stuffing box 39 located on the end of shaft 41 and extends into conduit 40 (Fig. 4) through the worm wheel drive shaft 41. Conduit 40 allows water to flow into water box 42, said water box having a tube sheet 43. Conduits 44 and 45 are the fluid inlet conduits or tubes, suitable caps 46 and 47 being mounted on the inner ends of said conduits, each of said pipe loops being connected in the manner about to be described to said inlet conduits.

As seen more clearly in Fig. 6, a pipe nipple 48, or other suitable connection, passes through an aperture 49 in shaft 18, pipe nipple 48 being screwed into aperture 52 in inlet conduit 44. Nut 53 is located on the pipe nipple so as to properly position the nipple and pipe relative to aperture 49, and a gasket 50 is provided under nut 51. Similarly, outlet conduits 54 and 55 are provided for receiving liquid from each of the pipe loops and leading the liquid to outlet 56, the liquid flowing into chamber 57 and then to outlet pipe 56, stuffing box 58 providing a tight connection between stationary pipe 56 and the rotating shaft 18. Summarizing, the heat exchange fluid will enter conduit 40, will be fed into inlet conduits 44 and 45, which will in turn feed liquid to each of the pipe loops. The liquid then will travel around the loops and be returned to the outlet conduits 54 and 55 and then flow to the exhaust through pipe 56. As appears further from Fig. 6, the respective inlet pipes 44 and 45 are mounted within and extend along the rotary shaft 18 in spaced relation to the respective outlet pipes 54 and 55, so that an effective space or air gap exists between them which serves as a heat insulating medium. Thus the inlet and outlet pipes are mounted within the shaft in a heat insulated relationship, and the full efficiency of heat exchange between the ingoing heat exchange fluid and the material held in tank 10 can be obtained without encountering objectionable transfer of heat between the ingoing and the outgoing fluids.

Adjustable brackets 64, 65 (Fig. 4) may be mounted on shaft 18 so as to position endwise said shaft, a collar 66 mounted on shaft 18 and one surface of stuffing box 67 serving as the thrust surfaces for said brackets.

As seen in Fig. 5, the bracket for the first pipe loop 23A may be in the form of two clamps 59 and 60 which are bolted to lugs 61 and 62 of coupling 63.

The coupling 21 between sections 19 and 20 of shaft 18 is shown in detail in Figs. 7 and 8. Flange 68 is welded to shaft or pipe 19 and flange 69 is welded to shaft 20. Tube plate 70 then can be fastened or welded to flange 68 and tube plate 71 welded to flange 69, holes previously having been placed in the tube sheets to receive the conduits. A gasket 72 with suitable apertures therein can be placed between the tube plates and when the shafts are assembled, the conduits can be aligned and bolts 73 employed to hold them in assembled position. Brackets 77 and 78 can be fastened to the coupling 21 in any suitable manner for supporting the uninterrupted leg of loop 23N.

The shaft assembly may be driven by means of worm gear 74 mounted in supports 75, said gear meshing with worm wheel 76, worm wheel 76 being mounted on drive shaft 41.

In operation, the massecuite or other material to be cooled is fed into the drum at 12. Water or other heat exchange medium is fed to the shaft and pipe loops through valves 36 and 37, the valves being adjusted manually so as to give the desired temperature although automatic control means can be used if desired. The driving means for the worm wheel and gear is operated so that the shaft 18 is rotated slowly. The pipes of the loops will traverse substantially all of the material in the drum, keeping it all in such relative motion and subject to such an even, regulated temperature change that crystallization will take place uniformly, and yet at a relatively fast rate, throughout the massecuite. The fast rate of heat exchange obtainable with this apparatus is the result of the relatively large area of heat exchange surface that it provides per unit volume of massecuite, while still enabling the ready rotation of the coils within the body of massecuite. An extraordinary degree of exhaustion of sugar from the mother liquor is achieved, and the time required to do this is far less than the cooling time of the crystallizers ordinarily used.

It is apparent that the apparatus can be used for other purposes than cooling massecuite. It can be used for heating purposes by feeding a heating medium into the pipe loops, such as for reheating the completely crystallized massecuite up to approximately its saturation temperature so that the massecuite will be easier to pump and better conditioned for treatment in centrifugal machines.

Various changes may be made in the specific embodiment shown and described without departing from the spirit of the invention or the scope of the appended claims. For instance, it will be evident that by the use of a suitable stuffing box arrangement at only one end of the shaft the fluid medium may be made both to enter and to leave the rotary coils at that one end.

It is claimed:

1. A rotary heat exchanger coil for sugar crystallization or the like comprising a shaft rotatable in a drum, a plurality of planar rectangularly shaped closed loops mounted on said shaft, each of said loops having a pair of legs, one leg of each loop comprising two portions substantially aligned with each other and connected with said shaft astraddle the same, the longitudinal axes of said loops being substantially at right angles to the axis of said shaft and the transverse axes of said loops being disposed at acute angles relative to the axis of said shaft, and means to conduct heat exchanging medium through said loops.

2. A rotary heat exchanger coil for sugar crystallization or the like comprising a shaft rotatable in a drum, a plurality of planar rectangularly shaped closed pipe loops, each loop having two legs, the transverse axes of the planes of said loops being disposed at acute angles relative to the axis of said shaft, one of the legs of each of said loops having portions substantially aligned and connected to said shaft astraddle the same, and fluid conducting and exhausing means carried by said shaft and connected with respective portions of the said legs so that a heat exchange medium may be conducted into, through, and from said loops in parallel flow arrangement.

3. In a heat exchanger for sugar crystallization or the like, a drum adapted to receive material, a shaft rotatable in said drum, a plurality of planar rectangularly shaped closed pipe loops, each of said loops having a pair of spaced substantially parallel legs joined together at their respective ends by connecting U-shaped portions, one leg of each loop comprising two portions substantially aligned with each other and connected with said shaft and astraddle the same, said loops having their longitudinal axes substantially perpendicular relative to the axis of the shaft and their transverse axes disposed at acute angles relative to said shaft axis, so that the pipes of said loops will describe paths traversing substantially all of said material in said drum during a revolution of the shaft, and means to conduct a heat exchanging medium through said loops.

4. In a heat exchanger for sugar crystallization or the like, a drum adapted to receive material, a shaft rotatable in said drum, a plurality of planar rectangularly shaped closed pipe loops mounted on said shaft, each of said loops having a pair of legs, one leg of each loop comprising two portions substantially aligned with each other and connected with said shaft astraddle the same, the longitudinal axes of said loops being substantially perpendicular relative to the axis of said shaft, the longitudinal axes of adjacent loops being angularly disposed relative to each other, the transverse axes of said loops being disposed at acute angles relative to the shaft axis so that the pipes of said loops will describe paths transversing substantially all of a material in said drum during a revolution of said shaft.

5. A rotary heat exchanger coil for sugar crystallization or the like comprising a shaft rotatable in a drum, a plurality of planar rectangularly shaped closed loops, each loop having two legs, one leg being uninterrupted and the other leg comprising two substantially aligned portions connected with said shaft astraddle the same, the longitudinal axes of said loops being substantially perpendicular relative to the axis of said shaft, the longitudinal axes of adjacent loops being angularly disposed relative to each other, the uninterrupted leg of every other loop being on opposite sides of the shaft, and means to conduct a heat exchanging medium through said closed loops.

6. A rotary heat exchanger coil for sugar crystallization or the like comprising a shaft rotatable in a drum, a plurality of planar rectangularly shaped closed loops, each loop having two legs, one of the legs of each of said loops comprising two portions substantially aligned and astraddle said shaft, the longitudinal axes of said loops being substantially perpendicular relative to the axis of said shaft, the longitudinal axes of adjacent loops being disposed substantially at right angles relative to each other, the uninterrupted leg of every other loop being on opposite sides of said shaft, and means to conduct a heat exchanging medium through said closed loops.

7. A rotary heat exchanger coil for sugar crystallization or the like comprising a shaft rotatable in a drum, said shaft having inlet and outlet conduits therein, a plurality of planar rectangularly shaped closed pipe loops, each of said loops having a pair of legs, one leg of each loop comprising two portions substantially aligned with each other and connected with said shaft astraddle the same, one of said portions of each loop being connected with an inlet conduit and the other portion of each loop being connected with an outlet conduit, the longitudinal axes of said loops being substantially perpendicular relative to the axis of said shaft, the transverse axes of said loops being at acute angles to said shaft axis, and means to conduct a heat exchanging medium to said inlet conduit and from said outlet conduit.

8. A rotary heat exchanger coil for sugar crystallization or the like comprising a shaft rotatable in a drum, said shaft having two inlet conduits and two outlet conduits therein, said conduits being spaced substantially 90° apart, a plurality of planar rectangularly shaped closed pipe loops, each loop having two legs, one of the legs of each of said loops being interrupted and having one portion connected with an inlet conduit and one portion connected with an outlet conduit, the longitudinal axes of said loops being substantially perpendicular relative to the axis of said shaft, the transverse axes of said loops being disposed at acute angles relative to said shaft axis, adjacent loops being disposed substantially at right angles relative to each other, the uninterrupted legs of every other loop being on opposite sides of said shaft, and means to conduct a heat exchanging medium to said inlet conduit and from said outlet conduit.

9. In a crystallizer, a drum, a hollow shaft rotatable in said drum, said shaft having two inlet conduits and two outlet conduits therein, a plurality of planar rectangularly shaped closed pipe loops spacedly mounted along said shaft, said loops having their longitudinal axes perpendicular to the shaft axis and their transverse axes disposed at acute angles relative to said shaft axis, the longitudinal axis of adjacent loops being at right angles to each other and the uninterrupted legs of every other loop being mounted on opposite sides of said shaft, connecting means between said inlet and outlet conduits and said loops, said connecting means assisting to hold said conduits in place, and means to feed a heat exchange medium to said inlet conduits.

10. In a crystallizer, a drum, a hollow shaft rotatable in said drum, said shaft having two inlet conduits and two outlet conduits therein, a plurality of planar rectangularly shaped closed pipe loops spacedly mounted along said shaft, said shaft, said loops having their longitudinal axes perpendicular to the shaft axis and their transverse axes disposed at acute angles relative to said shaft axis, the longitudinal axis of adjacent loops being at right angles to each other and the uninterrupted legs of every other loop being mounted on opposite sides of said shaft, connecting means between said inlet and outlet conduits and said loops, said connecting means assisting to hold said conduits in place, scraper blades mounted on one end of each of said loops, and means to feed a heat exchange medium to said inlet conduits.

11. In a crystallizer, a hollow shaft rotatable in a drum, said shaft having an inlet pipe and an outlet pipe therein, a plurality of closed pipe loops each having the two ends thereof connected to said shaft, means connecting said inlet and outlet pipes, respectively, to respective ends of said loops so that a heat exchange medium fed into said inlet pipe passes in parallel flow through said loops and out through said outlet pipe, and a heat insulating medium between said inlet pipe and said outlet pipe within said shaft to limit heat exchange therebetween.

12. In a crystallizer or the like, a hollow shaft rotatable in a drum, separate inlet and outlet pipes for a heat exchange medium mounted within and extending longitudinally along said hollow shaft and spaced from each other so that the pipes are in heat insulated relationship, a plurality of planar rectangularly shaped closed pipe loops mounted on said shaft, each of said loops having a pair of legs, one leg of each loop comprising two portions substantially aligned with each other and connected with said shaft astraddle the same, said inlet and outlet pipes respectively being connected with respective portions of said legs.

JOHN W. STAFFORD.

REFERENCES CITED

The following references are of record in the file of this patent:

UNITED STATES PATENTS

| Number | Name | Date |
|---|---|---|
| 615,329 | Whiteley | Dec. 6, 1898 |
| 1,934,787 | Bjorklund | Nov. 14, 1933 |
| 2,153,082 | Grill | Apr. 4, 1939 |
| 2,379,895 | Feldstein | July 10, 1945 |

FOREIGN PATENTS

| Number | Country | Date |
|---|---|---|
| 313,290 | Great Britain | June 13, 1929 |
| 35,237 | Germany | Apr. 17, 1886 |

Certificate of Correction

Patent No. 2,458,440. January 4, 1949.

JOHN W. STAFFORD

It is hereby certified that errors appear in the printed specification of the above numbered patent requiring correction as follows:

Column 8, line 4, claim 10, strike out "said" second occurrence; line 5, same column, strike out the word and comma "shaft,";
and that the said Letters Patent should be read with these corrections therein that the same may conform to the record of the case in the Patent Office.

Signed and sealed this 3rd day of May, A. D. 1949.

[SEAL]

THOMAS F. MURPHY,
*Assistant Commissioner of Patents.*